United States Patent [19]

Striegl

[11] 4,182,587

[45] Jan. 8, 1980

[54] MILLING CUTTER AND INDEXABLE INSERT THEREFOR

[75] Inventor: Georg Striegl, Reutingen, Fed. Rep. of Germany

[73] Assignee: Ingersoll Maschinen und Werkzeuge GmbH, Burbach, Fed. Rep. of Germany

[21] Appl. No.: 900,263

[22] Filed: Apr. 26, 1978

[51] Int. Cl.² .............................................. B26D 1/12
[52] U.S. Cl. .................................. 407/113; 407/48; 407/55; 407/59; 407/61
[58] Field of Search ................... 407/113, 114, 40, 41, 407/47, 48, 51, 56, 58, 102, 103, 61, 104, 105, 107, 55, 59

[56] References Cited

U.S. PATENT DOCUMENTS

| | | | |
|---|---|---|---|
| 3,142,110 | 7/1964 | Hertel | 407/105 |
| 3,226,797 | 1/1966 | Hertel | 407/113 |
| 3,289,271 | 12/1966 | Stier | 407/113 |
| 3,490,117 | 1/1970 | Hertel | 407/105 |
| 3,541,655 | 11/1970 | Stier | 407/113 |
| 3,694,876 | 10/1972 | Erkfritz | 407/113 |
| 3,762,005 | 10/1973 | Erkfritz | 407/113 |

Primary Examiner—Harrison L. Hinson
Attorney, Agent, or Firm—Leydig, Voit, Osann, Mayer & Holt, Ltd.

[57] ABSTRACT

An on-edge, double positive rake, indexable cutting insert in which a short cutting edge is formed along one side of one face surface of the insert while a longer cutting edge is formed along an angularly related side of the other face surface of the insert. Inserts of this type are particularly well suited for use as the outer inserts in an end mill having helical slots for receiving the inserts. When so used, two inserts are placed in side-by-side relation in one slot with their short cutting edges located in active cutting position while one insert is positioned in an adjacent slot with its long cutting edge located in active cutting position and axially overlapping the gap between the two short cutting edges. With this arrangement, material which is left uncut between adjacent inserts in one slot is cut away by the overlapping insert in the adjacent slot. Each insert includes edge surfaces defining clearance faces for the two cutting edges and enabling each cutting edge to make a right angle cut.

17 Claims, 18 Drawing Figures

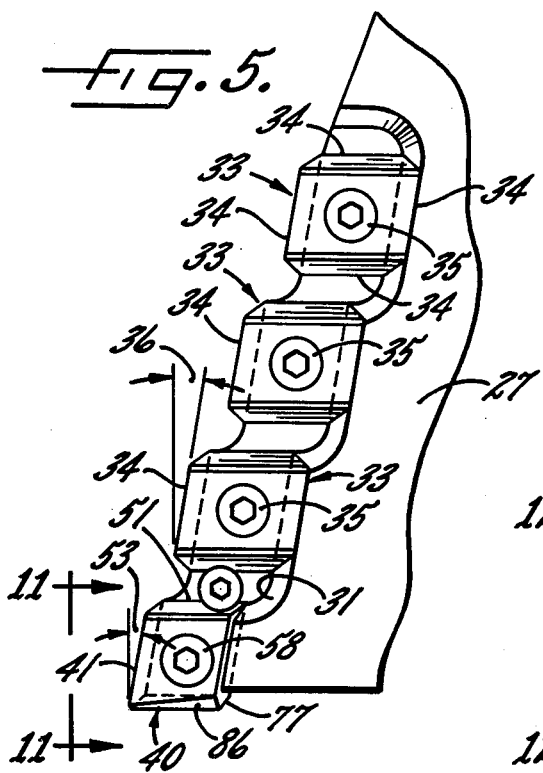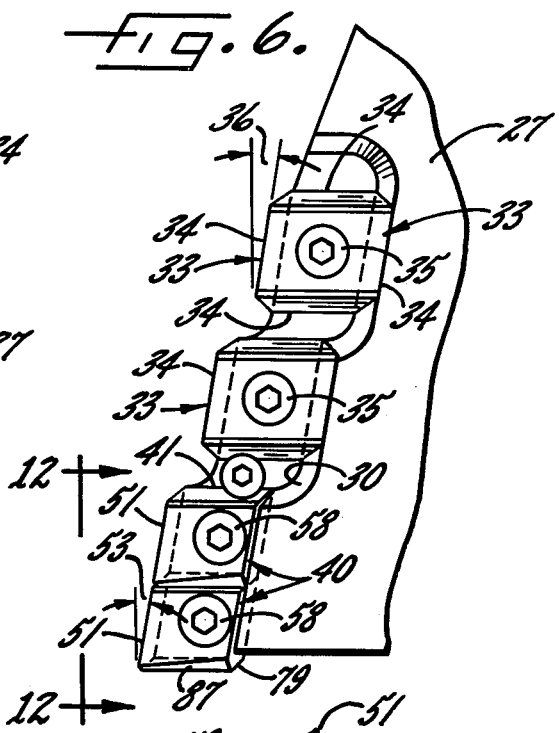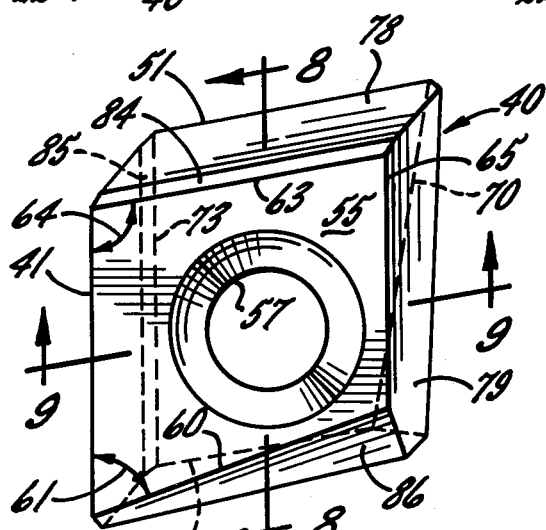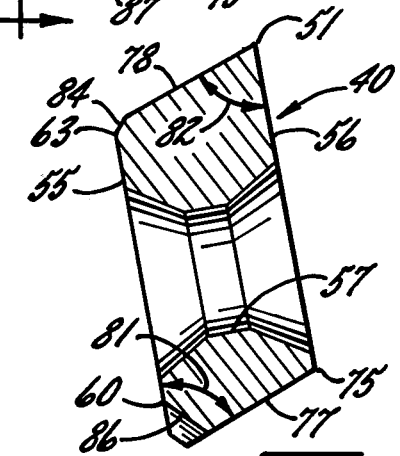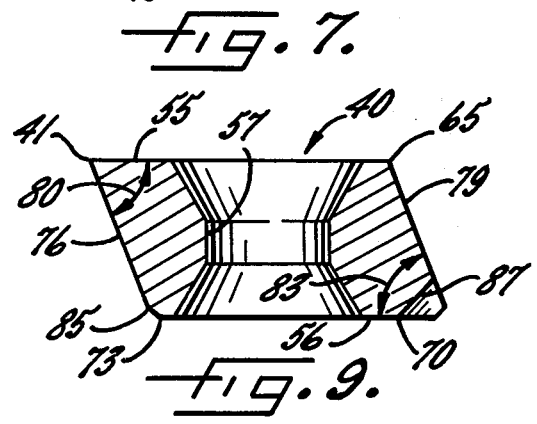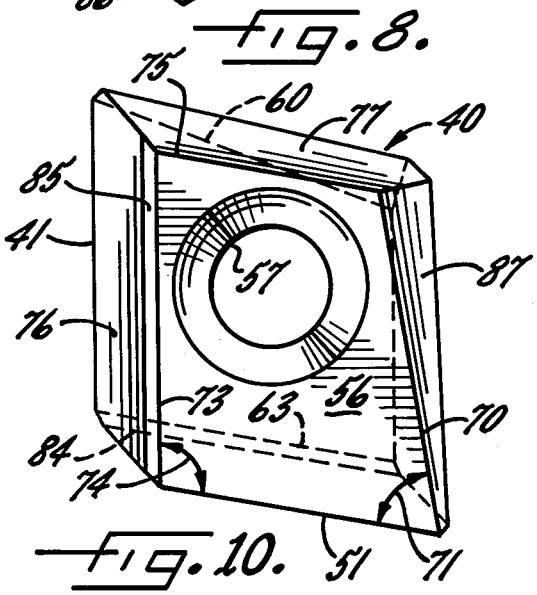

4,182,587

MILLING CUTTER AND INDEXABLE INSERT THEREFOR

BACKGROUND OF THE INVENTION

This invention relates to indexable cutting inserts and to a rotary cutter adapted to use such inserts. The invention has more particular reference to an indexable cutting insert which is of the "on-edge" type and which includes selectively useable cutting edges with each edge being adapted to cut at positive axial and radial rake angles.

On-edge inserts are disclosed in Hertel U.S. Pat. Nos. 3,142,110; 3,226,797 and 3,490,117 and in Erkfritz U.S. Pat. Nos. 3,694,876 and 3,762,005. The term "on-edge" applies to the presentation of the cutting material of the insert to the workpiece in such a manner that the compressive strength of the cutting material which opposes the tangential forces imposed on the insert is greater than the compressive strength which opposes the other forces exerted on the insert. Accordingly, an insert having a given volume of cutting material can be forced through the work with greater power without failing if the insert is of the on-edge type.

When the active cutting edge of the insert is disposed at positive axial and radial (i.e., double positive) rake angles, the edge is relatively sharp and less power is required to cut the workpiece than is the case when the edge is at a negative rake and is relatively blunt. Accordingly, an on-edge insert with cutting edges adapted to cut at double positive rake angles is advantageous in that the active cutting edge can cut the work with relatively low power and yet can withstand comparatively high forces before failing. Thus, the insert gives the user a choice of optimizing power and cutting speed according to his particular needs.

I have previously made an insert which is generally similar in shape to that disclosed in FIG. 4 of Stier U.S. Pat. No. 3,289,271 and have used that insert for on-edge cutting in a rotary cutter. For example, that insert can be employed in a face milling cutter. When so employed, however, it is necessary to position the insert at a lead angle on the cutter body in order to provide the necessary face clearance between the insert and the workpiece. When the insert is positioned at a lead angle, it is not capable of making a right angle cut and thus cannot be used for milling a workpiece which might have a square shoulder or the like.

Inserts of the type which I have previously made also may be placed in side-by-side relation in the rear stations of the angularly spaced slots of a helical end milling cutter. In such an arrangement, the inserts in one slot are staggered axially with respect to the inserts of an adjacent slot so that material which is left uncut between two side-by-side inserts in one slot is cut away by the insert of the adjacent slot. Such inserts, however, are not suitable for use in the front stations of the slots of an end mill since the inserts cannot be located to provide face clearance and are not capable of making a right angle cut.

SUMMARY OF THE INVENTION

The general aim of the present invention is to provide an on-edge, double positive, indexable cutting insert which is uniquely designed to provide face clearance between the insert and the workpiece without need of positioning the insert at a lead angle and further is designed to enable each available cutting edge to make a right angle cut in the workpiece.

A further object of the invention is to provide such an insert wherein one of the cutting edges of each insert is shorter than another cutting edge of the insert. With this arrangement, the inserts may be uniquely positioned in the front stations of the slots of an end mill with two inserts located in side-by-side relation in one slot with their short edges in active cutting position and with another insert located in a trailing slot with its long edge in active cutting position and axially overlapping the gap between the short edges of the inserts in the leading slot. As a result, the extreme outer end of the long cutting edge of the insert in the trailing slot may be located at the same axial position as the extreme outer end of the short cutting edge of the outermost insert in the leading slot and yet will cut away the material left between the two short cutting edges. By appropriately indexing and inverting the inserts and shifting the inserts from slot-to-slot, both the long and short cutting edges of each insert may be effectively used.

In brief, the invention resides in the novel geometry of the insert and in the provision of a new and improved end milling cutter which incorporates a plurality of such inserts in a unique manner.

These and other objects and advantages of the invention will become more apparent from the following detailed description when taken in conjunction with the accompanying drawings.

BRIEF DESCRIPTION OF THE DRAWINGS

FIGS. 5 and 6 are enlarged fragmentary views of parts of the cutter illustrated in FIG. 2 and showing two adjacent slots of the cutter.

FIG. 7 is a view of one face of the insert.

FIGS. 8 and 9 are cross-sections taken substantially along the lines 8—8 and 9—9, respectively, of FIG. 7.

FIG 10 is a view of the opposite face of the insert shown in FIG. 7.

DETAILED DESCRIPTION OF THE PREFERRED EMBODIMENTS

Figure 1:
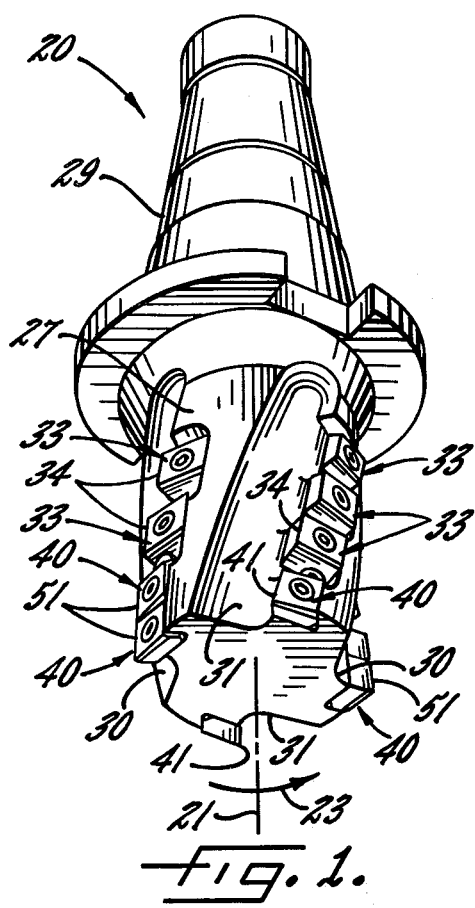
FIG. 1 is a perspective view of a new and improved end milling cutter constructed in accordance with the invention and having unique indexable cutting inserts incorporating the features of the invention.
Figure 3:
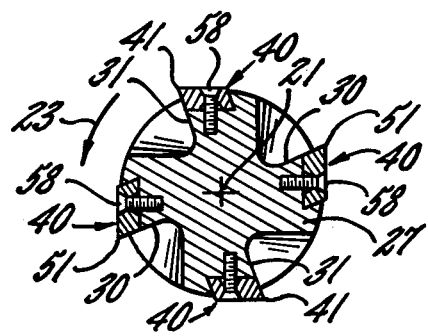
FIG. 3 is a cross-section taken substantially along the line 3—3 of FIG. 2.
Figure 2:
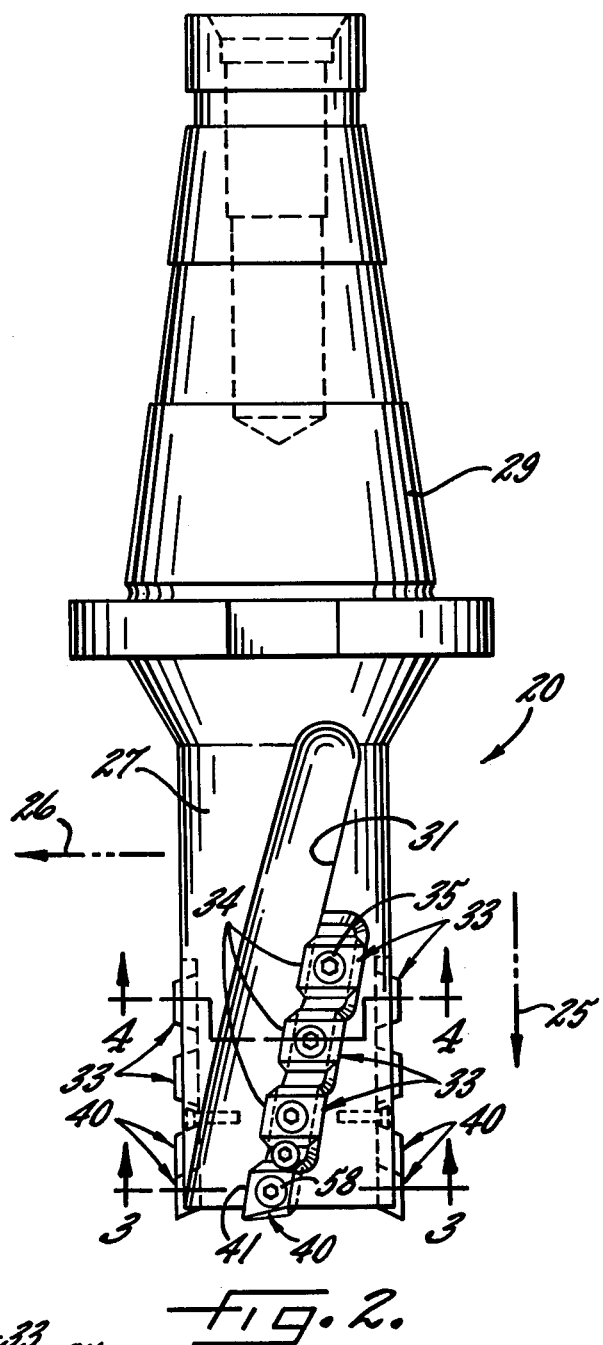
FIG. 2 is an enlarged plan view of the cutter shown in FIG. 1.
Figure 4:
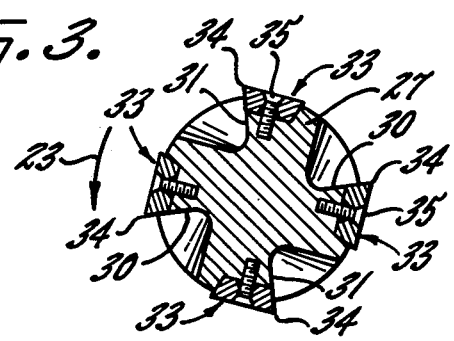
FIG. 4 is a cross-section taken substantially along the line 4—4 of FIG. 2.

While some of the principles of the invention are applicable to various types of cutters, reference herein is made to an end milling cutter 20 rotatable about a central axis 21 in the direction of the arrow 23 and adapted to be moved endwise or axially toward a workpiece 24 (FIG. 11) in the direction of the arrow 25 (FIG. 2) and then fed radially in the direction of the arrow 26 so as to remove metal from the workpiece. More specifically, the cutter 20 includes a cylindrical metal body 27 having a mounting shank 29 at its inner end and formed with four angularly spaced and alternating slots 30 and 31 (FIG. 3). Each slot opens out of the outer end of the body and out of the peripheral surface thereof. The cutter which has been illustrated is commonly called a helical end mill in that each slot extends helically along and around the axis 21 of the cutter.

Disposed in the rear or inner end portion of each slot 30 and 31 is a row of indexable cutting inserts 33. Briefly, each insert 33 is formed from a block of suitable cutting material such as tungsten carbide and includes four selectively useable cutting edges 34 (see the innermost insert of FIG. 5). Each insert is supported in a pocket defined in its respective slot and is held in place by a screw 35 inserted through the center of the insert and threaded into the cutter body 27. When the insert is located in the pocket, the cutting edge which is disposed in active cutting position faces circumferentially and is located at a positive axial rake angle 36 as shown in FIG. 6. Moreover, the active cutting face of the insert is located at a positive radial rake angle. By appropriately indexing and/or inverting the insert 33, each of its other three cutting edges may be brought into active cutting position.

As shown in FIGS. 5 and 6, two inserts 33 are disposed in each of the slots 30 while three inserts 33 are disposed in each of the slots 31, the inserts in each slot being located in axially spaced side-by-side relation and also being spaced circumferentially from one another. Because of the circumferential spacing, the inserts in each slot do not engage the workpiece 24 simultaneously but instead move into progressive engagement with the workpiece as the cutter 20 rotates.

The two inserts 33 in each of the slots 30 are staggered axially with respect to the three inserts 33 in each of the slots 31 (see FIGS. 5 and 6). Thus, the active cutting edge 34 of the innermost insert 33 in each slot 30 axially spans the gap between the active cutting edges of the innermost and center inserts 33 in the adjacent slots 31 while the active cutting edge of the outermost insert 33 in each slot 30 axially spans the gap between the active cutting edges of the center and outermost inserts 33 in each of the slots 31. Moreover, the active cutting edge 34 of the center insert 33 in each slot 31 axially spans the gap between the two inserts 33 in each of the slots 30. As a result of the staggered arrangement of the inserts 33 in adjacent slots 30 and 31, the workpiece material which is left uncut between adjacent inserts of one slot is wiped away by the intervening insert in the following slot.

Figure 3A:
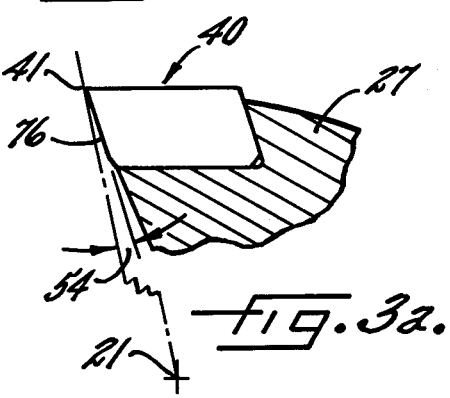
FIG. 3a is an enlarged fragmentary view of the cutter and one of the inserts shown in FIG. 3.

The present invention contemplates the provision of a novel insert 40 which is particularly well suited for use as the outermost insert in each slot 30, 31 of the end mill 20 and which also is capable of advantageous use in other types of cutters. The insert 40 is characterized by the fact that it is an on-edge, indexable insert having a plurality of cutting edges 41 and 51 each adapted to cut at a positive axial rake angle 53 (FIG. 5) and a positive radial rake angle 54 (FIG. 3a) with each cutting edge being associated with a clearance face which enables the insert to make a right angle cut in the workpiece 24. In the preferred embodiment, the cutting edge 41 is longer than the cutting edge 51 for an advantageous purpose to be described subsequently.

More particularly, the insert 40 is formed from a block of tungsten carbide or other suitable cutting material and is defined by first and second substantially planar face surfaces 55 and 56 (FIGS. 7 and 10) disposed in substantially parallel planes. The insert 40 is shown in detail in FIGS. 7 to 10 and, for purposes of convenience in describing the insert, the first and second face surfaces 55 and 56 will be referred to as upper and lower face surfaces, respectively. A double countersunk hole 57 extends through the insert between the face surfaces and is adapted to receive a screw 58 (FIGS. 3, 5 and 6) for securing the insert to the cutter body 27. The axis of the hole is disposed perpendicular to the face surfaces. The perpendicular distance between the face surfaces is about 3/16".

Herein, the upper face surface 55 is shaped as a quadrilateral and includes a first side 41 which defines the long cutting edge of the insert. One adjacent side 60 of the face surface 55 is disposed at an acute included angle 61 relative to the first side 41 while the other adjacent side 63 is disposed at an obtuse included angle 64 relative to the first side 41. The fourth side 65 of the upper face surface 55 extends parallel to the first side 41.

The lower face surface 56 also is shaped as a quadrilateral and includes a first side 51 (FIG. 7) which defines the short cutting edge of the insert 40. In this instance, the short cutting edge 51 is approximately 5/16" in length while the long cutting edge 41 is approximately ⅜" in length. The short cutting edge 51 is disposed at an angle of approximately 100 degrees relative to the long cutting edge 41.

A second side 70 (FIG. 10) of the lower face surface 56 is inclined at an acute included angle 71 relative to the adjacent first side 51 while the other adjacent side 73 is disposed at an obtuse included angle 74 relative to the first side. As before, the fourth side 75 of the lower face surface 56 extends parallel to the first side 51.

The insert 40 is completed by four edge surfaces 76, 77, 78 and 79 which extend between the face surfaces 55 and 56. The first edge surface 76 extends between the first side 41 of the upper face surface 55 and the third side 73 of the lower face surface 56 and defines a cutting face for the long cutting edge 41. That cutting edge is defined by the intersection of the first edge surface 76 with the first side 41 of the upper face surface 55. Importantly, the first edge surface 76 is inclined downwardly and inwardly from the upper face surface 55 at an acute included angle 80 (FIG. 9). As a result, the cutting face defined by the first edge surface 76 may be located at a positive radial rake angle 54 when the insert 40 is installed in the cutter body 27. Because the cutting edge 41 is inclined at an acute included angle 61 relative to the adjacent side 60 of the upper face surface 55, the cutting edge may be located at a positive axial rake angle 53 when the insert 40 is installed in the cutter body 27.

As shown in FIG. 8, the second edge surface 77 extends between the second side 60 of the upper face surface 55 and the fourth side 75 of the lower face surface 56. The second edge surface 77 is inclined downwardly and inwardly at an acute angle 81 relative to the second side 60 of the upper face surface 55 and defines a clearance face for the long cutting edge 41.

The third edge surface 78 extends between the short cutting edge or first side 51 of the lower face surface 56 and the third side 63 of the upper face surface 55 (see FIG. 8). The short cutting edge 51 is defined by the intersection of the first side of the lower face surface 56 with the third edge surface 78. Such edge surface is inclined upwardly and inwardly at an acute included angle 82 (FIG. 8) relative to the first side 51 of the lower face surface 56 and defines a cutting face for the short cutting edge defined by the first side. By virtue of the acute angle 82, the cutting face defined by the edge surface 78 may be located at a positive radial rake angle 54 when the insert 40 is mounted in the cutter body 27. In addition, the cutting edge 51 may be disposed at a positive axial rake angle 53 as a result of the acute included angle 71 between the cutting edge 51 and the adjacent side 70 of the lower face surface 56.

The fourth edge surface 79 (FIG. 9) extends between the second side 70 of the lower face surface 56 and the fourth side 65 of the upper face surface 55 and defines a clearance face for the short cutting edge 51. The fourth edge surface 79 is inclined upwardly and inwardly at an acute included angle 83 relative to the second side 70 of the lower face surface 56.

As shown in FIGS. 7 and 8, the junction between the third edge surface 78 and the third side 63 of the upper face surface 55 is defined by a chamfer 84 having parallel sides extending along the third side of the upper face surface. A similar chamfer 85 (FIGS. 9 and 10) is formed at the junction of the first edge surface 76 with the third side 73 of the lower face surface 56, the chamfer 85 having parallel sides extending along the third side of the lower face surfaces. The chamfers 84 and 85 eliminate sharp corners at the inner ends of the cutting edges 41 and 51, respectively, and thereby reduce breakage of such ends.

In the insert shown in FIGS. 7 to 10, a trapezoidal chamfer 86 is formed at the junction of the second edge surface 77 and the second side 60 of the upper face surface 55. The chamfer 86 increases in width as it progresses from the first side 41 of the upper face surface 55 to the fourth side 65 thereof and provides additional clearance between the insert 40 and the workpiece 24 when the long cutting edge 41 is in active cutting position. As a result of the trapezoidal chamfer 86, the second side 60 of the upper face surface 55 does not extend parallel to the third side 63 thereof.

A similar trapezoidal chamfer 87 (FIGS. 9 and 10) is formed at the junction of the fourth edge surface 79 with the second side 70 of the lower face surface 56 in order to provide additional clearance between the insert 40 and the workpiece 24 when the short cutting edge 51 is in active cutting position. The chamfer 87 increases in width as it progresses from the first side 51 of the lower face surface 56 to the fourth side 75 thereof and results in the second side 70 of the lower face surface 56 being non-parallel with the third side 73 thereof.

As shown in FIGS. 8 and 9, the included angles 80 to 83 between the face surfaces 55 and 56 and the edge surfaces 76 to 79 are equal to one another and each is approximately 20 degrees. Thus, the first edge surface 76 parallels the fourth edge surface 79 while the second edge surface 77 parallels the third edge surface 78. The angles 61 and 64 are equal to the angles 71 and 74, respectively.

Figure 11:
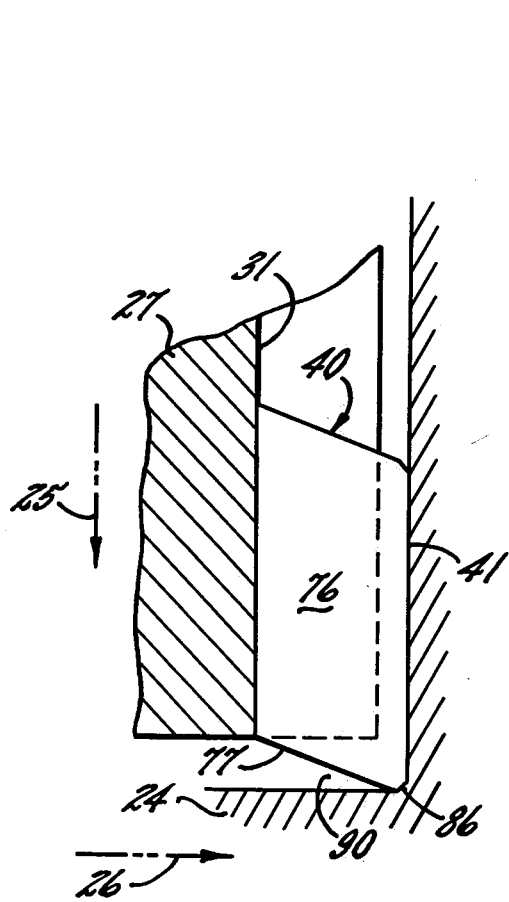
FIGS. 11 and 12 are enlarged fragmentary views taken substantially along the lines 11—11 and 12—12, respectively, of FIGS. 5 and 6, respectively, and show the inserts of adjacent slots progressively cutting a workpiece.

In carrying out the invention, one insert 40 is located in the outermost portion of each of the slots 31 and is oriented with its long cutting edge 41 in active cutting position (see FIGS. 5 and 11). Moreover, two inserts 40 are located in side-by-side relation in the outermost portion of each of the slots 30 and are oriented with their short cutting edges 51 in active cutting position (see FIGS. 6 and 12). The insert 40 in each slot 31 and the outermost insert 40 in each slot 30 are located such that the outer end of the active long cutting edge 41 of one insert is disposed in the same axial position as the outer end of the active short cutting edge 51 of the other insert. In addition, the clearance face 77 for the active long cutting edge 41 is disposed in the same plane as the clearance face 79 for the active short edge 51. As a result, the outer ends of all of the outer inserts 40 follow the same path along the workpiece 24 when the body 27 is rotated and thus the outer ends of the inserts make an identical cut in the workpiece.

By virtue of the insert 40 in each of the slots 31 being positioned with its long cutting edge 41 in active cutting position, such cutting edge axially overlaps the two short active cutting edges 51 of the two inserts 40 in the adjacent slot 30 and spans the axial gap between the two short cutting edges. In addition, the two active short cutting edges 51 of the inserts 40 in each slot 30 span the gap between the active long cutting edge 41 of the insert 40 in the slot 31 and the active cutting edge 34 of the adjacent insert 33 in the latter slot. Accordingly, the active long cutting edge 41 of the insert 40 in the slot 31 wipes away the material which is left uncut in the gap between the active short cutting edges 51 of the two inserts 40 in the slot 30 and, at the same time, the latter inserts wipe away the material which is left uncut in the gap between the active long cutting edge 41 of the insert 40 in the slot 31 and the cutting edge 34 of the adjacent insert 33 in that slot. Thus, the material in the various gaps is cut away even though the outer end of the active cutting edge 41, 51 of each end insert 40 is located in the same axial position.

When the active cutting edges 41 and 51 of the inserts 40 become worn, the inserts are removed from the slots 30 and 31. The inserts 40 which previously were in the two slots 31 are inverted and indexed and then are both placed in side-by-side relation in one of the slots 30 with the short cutting edges 51 in active cutting position. Two new inserts 40 are similarly positioned in the other slot 30. The two inserts 40 which previously were in one of the slots 30 are indexed and inverted and then each is placed in one of the slots 31 with the long cutting edge 41 of each insert in active cutting position. The two inserts 40 from the other slot 30 are held in storage until the inserts are again changed, at which time the inserts in storage are each placed in one of the slots 31 with the long cutting edge 41 of each in active cutting position. In this way, the two cutting edges 41 and 51 of each insert may be effectively used.

As shown in FIGS. 5 and 6, the active cutting edge 41, 51 of each insert 40 is disposed at a positive axial rake angle 53 since each cutting edge is disposed rearwardly, in the intended direction of rotation of the cutter 20, of a line paralleling the axis 21 of the cutter and extending through the axially outermost and of the cutting edge. In addition, the cutting face 76, 78 of each active cutting edge 41, 51 is disposed at a positive radial rake angle 54 in that each cutting face is disposed rearwardly, in the intended direction of rotation, of a radius extending from the axis of the cutter to the axially outermost end of the active cutting edge. As a result, each cutting edge is relatively sharp and may be forced through the workpiece 24 with less power than is the case when the edge is at a negative radial angle. Moreover, the geometry causes the insert 40 to be of the on-edge type in that the tangential or circumferential dimension of the insert, regardless of whether the long or short cutting edge 41 or 51 is in active cutting position, is greater than the radial dimension of the insert. Accordingly, the tangential forces which are imposed on each cutting edge are backed by a relatively wide mass of cutting material.

Figure 12:
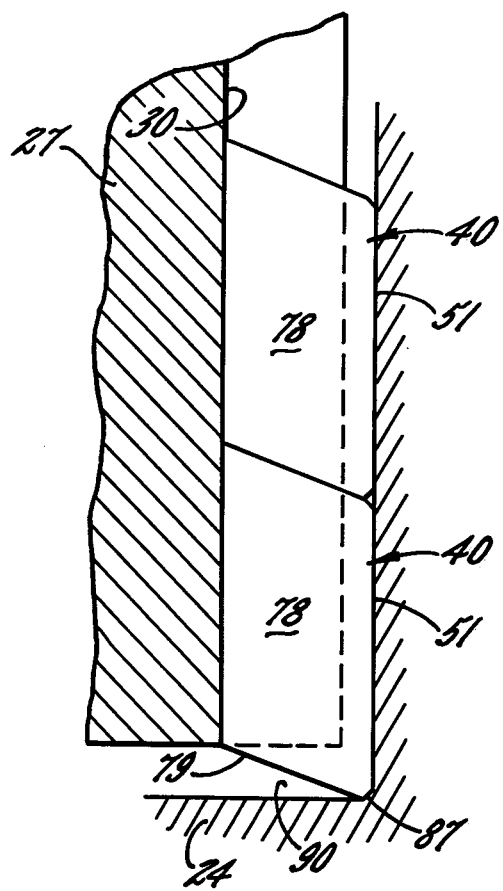
Figure 13:
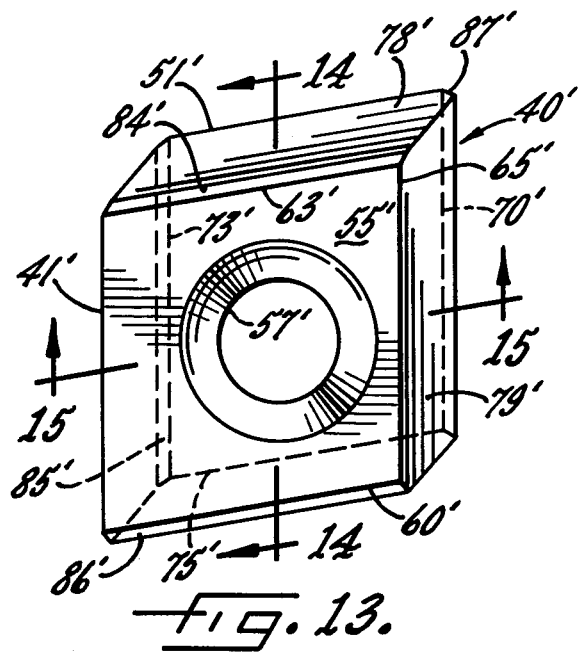
FIG. 13 is a view of one face of a modified insert.
Figure 14:
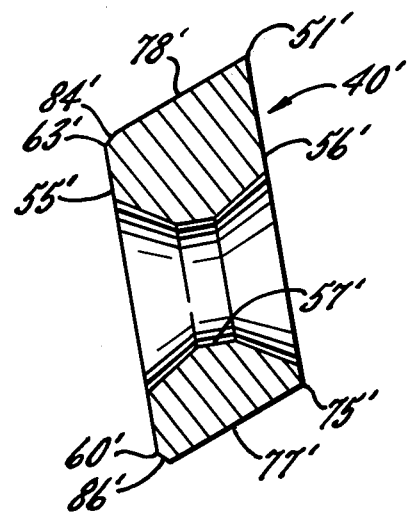
FIGS. 14 and 15 are cross-sections taken substantially along the lines 14—14 and 15—15, respectively, of FIG. 13.
Figure 15:
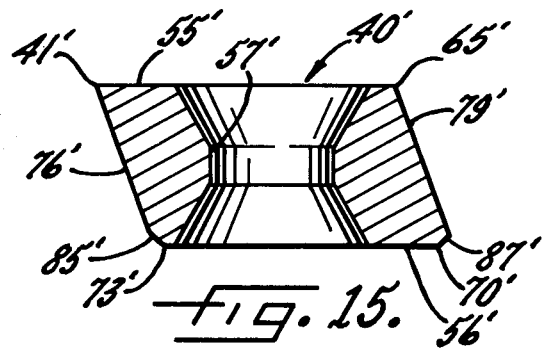
Figure 16:
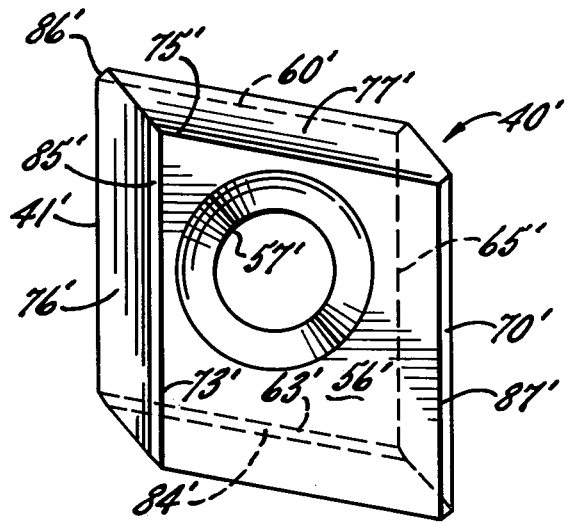
FIG. 16 is a view of the opposite face of the insert shown in FIG. 13.

Because the clearance faces 77 and 79 of the cutting edges 41 and 51 are inclined at acute included angles 81 and 83 relative to the face surfaces 55 and 56, respectively, face clearance as indicated at 90 (FIGS. 11 and 12) is established automatically between the clearance faces and the workpiece 24 when the face surfaces 55 and 56 are disposed perpendicular to the workpiece. Thus, there is no need to incline the inserts 40 at a lead angle on the body 27 to provide the face clearance and, in addition, the outer end of each active cutting edge 41, 51 is capable of cutting immediately adjacent a right angle shoulder on the workpiece. In FIGS. 11 and 12, the corner of the cut is shown as including a bevel which results from the chamfers 86 and 87 on the inserts. If the chamfers were omitted, the corner of the cut would be square.

The unique geometry of the invention may be explained somewhat more clearly by reference to the modified insert 40' shown in FIGS. 13 to 17. With but one exception, the modified insert 40' is identical to the insert 40 and thus the same but primed reference numerals have been used to indicate those elements of the insert 40' that correspond to the elements of the insert 40. The sole difference between the inserts 40 and 40' is that the chamfers 86' and 87' have parallel sides rather than being trapezoidal.

Figure 17:
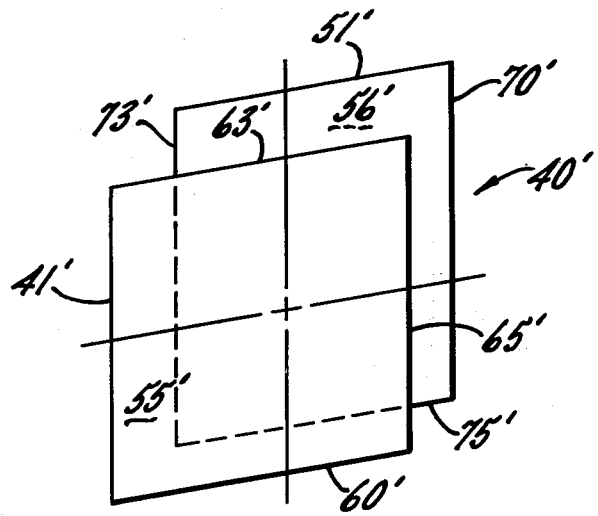
FIG. 17 is a diagrammatic view of the insert illustrated in FIGS. 13 to 16 and shows one face surface of the insert in direct overlying relation with the other face surface of the insert.

With the chamfers 86' and 87' thus formed, the two face surfaces 55' and 56' of the insert define two rhomboids as shown in FIG. 17. The rhomboid defined by the face surface 55' is offset relative to the rhomboid defined by the face surface 56' in such a manner that the long sides 41', 65' of the rhomboid 55' extend parallel to the long sides 70', 73' of the rhomboid 56' while the short sides 60', 63' of the rhomboid 55' extend parallel to the short sides 51', 75' of the rhomboid (see FIG. 17). The long sides 41', 65' of the rhomboid 55' are spaced outwardly and inwardly, respectively, from the most nearly adjacent long sides 73', 70', respectively, of the rhomboid 56' while the short sides 60', 63' of the rhomboid 55' are spaced outwardly and inwardly, respectively, from the most nearly adjacent short sides 75', 51', respectively, of the rhomboid 56'. The spacing between the sides 41' and 73' is equal to the spacing between the sides 51' and 63' while the spacing between the sides 60' and 75' is equal to the spacing between the sides 65' and 70'. If the chamfers 84' to 87' were not present, the spacing between every adjacent pair of parallel sides would be equal to the spacing between every other pair of parallel sides.

Edge surfaces 76', 77', 78' and 79' also are shaped substantially as rhomboids and extend between the sides of the face surfaces 55' and 56'. The long cutting edge is defined by the intersection of the edge surface 76' with the outwardly spaced long side 41' of the face surface 55' while the short cutting edge is defined by the intersection of the edge surface 78' with the outwardly spaced short side 51' of the face surface 56'.

I claim:

1. A cutting insert comprising a block of cutting material having first and second quadrilateral and substantially flat face surfaces disposed in parallel planes, a first side of said first face surface being located at an acute included angle relative to a second and adjacent side of said first face surface and at an obtuse included angle relative to a third side of said first face surface, said first face surface having a fourth side substantially paralleling said first side, a first side of said second face surface being located at an acute included angle relative to a second and adjacent side of said second face surface and at an obtuse included angle relative to a third and adjacent side of said second face surface, said second face surface having a fourth side substantially paralleling the first side of said second face surface, a first edge surface extending between the first side of said first face surface and the third side of said second face surface, said first edge surface being inclined at an acute included angle relative to the first side of said first face surface and at an obtuse included angle relative to the third side of said second face surface, a second edge surface extending between the second side of said first face surface and the fourth side of said second face surface, said second edge surface being inclined at an acute included angle relative to the second side of said first face surface and at an obtuse included angle relative to the fourth side of said second face surface, a third edge surface extending between the third side of said first face surface and the first side of said second face surface, said third edge surface being inclined at an obtuse included angle relative to the third side of said first face surface and at an acute included angle relative to the first side of said second face surface, and a fourth edge surface extending between the fourth side of said first face surface and the second side of said second face surface, said fourth edge surface being inclined at an obtuse included angle relative to the fourth side of said first face surface and at an acute included angle relative to the second side of said second face surface.

2. A cutting insert as defined in claim 1 in which the acute included angle between said first edge surface and the first side of said first face surface is equal to the acute included angle between said third edge surface and the first side of said second face surface.

3. A cutting insert as defined in claim 2 in which the acute included angle between said second edge surface and the second side of said first face surface is equal to the acute included angle between said fourth edge surface and the second side of said second face surface.

4. A cutting insert as defined in claim 3 in which said first edge surface is disposed in a plane which parallels the plane of said fourth edge surface, said second surface being disposed in a plane which parallels the plane of said third edge surface.

5. A cutting insert as defined in claim 4 in which the first side of said first face surface is longer than the first side of said second face surface.

6. A cutting insert as defined in claim 1 in which the junction between said second edge surface and the second side of said first face surface is defined by a first chamfer, the junction between said fourth edge surface and the second side of said second face surface being defined by a second chamfer.

7. A cutting insert as defined in claim 6 in which each of said chamfers is trapezoidal in shape, said first chamfer increasing in width upon progressing from said first edge surface toward said fourth edge surface, said second chamfer increasing in width upon progressing from said third edge surface toward said second edge surface.

8. A cutting insert as defined in claim 1 in which said edge surfaces are shaped substantially as rhomboids.

9. A cutter for cutting a workpiece and comprising a rotary body having an outer periphery and having first and second angularly spaced slots formed in its outer periphery, first and second cutting inserts disposed in said first and second slots, respectively, each of said inserts comprising a block of cutting material having first and second quadrilateral and substantially flat face surfaces disposed in parallel planes, a first side of said first face surface being located at an acute included angle relative to a second and adjacent side of said first face surface and at an obtuse included angle relative to a third side of said first face surface, said first face surface having a fourth side substantially paralleling said first side, a first side of said second face surface being located at an acute included angle relative to a second and adjacent side of said second face surface and at an obtuse included angle relative to a third and adjacent side of said second face surface, said second face surface having a fourth side substantially paralleling the first side of said second face surface, a first edge surface extending between the first side of said first face surface and the third side of said second face surface, said first edge surface being inclined at an acute included angle relative to the first side of said first face surface and at an obtuse included angle relative to the third side of said second face surface, a second edge surface extending between the second side of said first face surface and the fourth side of said second face surface, said second edge surface being inclined at an acute included angle relative to the second side of said first face surface and at an obtuse included angle relative to the fourth side of said second face surface, a third edge surface extending between the third side of said first face surface and the first side of said second face surface, said third edge surface being inclined at an obtuse included angle relative to the third side of said first face surface and at an acute included angle relative to the first side of said second face surface, and a fourth edge surface extending between the fourth side of said first face surface and the second side of said second face surface, said fourth edge surface being inclined at an obtuse included angle relative to the fourth side of said first face surface and at an acute angle included relative to the second side of said second face surface, said first insert being located with its first edge surface disposed in leading relationship with respect to its fourth edge surface and with its second edge surface located adjacent a workpiece when said first insert is cutting the workpiece, said second insert being located with its third edge surface disposed in leading relationship with respect to its second edge surface and with its fourth edge surface located adjacent a workpiece when said second insert is cutting the workpiece.

10. A cutter as defined in claim 9 in which the first side of the first face surface of each insert is longer than the first side of said second face surface of the insert, there being two inserts disposed in said second slot with each of said latter inserts being located with its third edge surface disposed in leading relationship with respect to its second edge surface and with its fourth edge surface located adjacent a workpiece when such insert is cutting the workpiece.

11. A cutting insert comprising a block of cutting material having upper and lower quadrilateral and substantially flat face surfaces disposed in parallel planes, a first side of said upper face surface being located at an acute included angle relative to a second and adjacent side of said upper face surface, a first side of said lower face surface being located at an acute included angle relative to a second and adjacent side of said lower face surface, a first edge surface extending between said first side of said upper face surface and a third side of said lower face surface, the intersection of said first edge surface with said upper face surface defining a first cutting edge along said first side of said upper face surface, said first edge surface being inclined downwardly and inwardly from said first cutting edge and defining a cutting face for said first cutting edge, a second edge surface extending between said second side of said upper face surface and a fourth side of said lower face surface, said second edge surface being inclined downwardly and inwardly from said second side of said upper face surface and defining a clearance face for said first cutting edge, a third edge surface extending between said first side of said lower face surface and a third side of said upper face surface, the intersection of said third edge surface with said lower face surface defining a second cutting edge along said first side of said lower face surface, said third edge surface being inclined upwardly and inwardly from said second cutting edge and defining a cutting face for said second cutting edge, a fourth edge surface extending between said second side of said lower face surface and a fourth side of said upper face surface, said fourth edge surface being inclined upwardly and inwardly from said second side of said lower face surface and defining a clearance face for said second cutting edge.

12. A cutting insert as defined in claim 11 in which said first edge surface and said fourth edge surface are disposed in parallel planes, said second edge surface and said third edge surface also being disposed in parallel planes.

13. A cutting insert as defined in claim 11 in which said first cutting edge is longer than said second cutting edge.

14. A cutter comprising a rotary body having an outer periphery and a direction of rotation and having first and second angularly spaced and helically extending slots formed in its outer periphery, a cutting insert disposed in the end portion of said first slot, said insert comprising a block of cutting material having upper and lower quadrilateral and substantially flat face surfaces disposed in parallel planes, a first side of said upper face surface being located at an acute included angle relative to a second adjacent side of said upper face surface, a first side of said lower surface being located at an acute included angle relative to a second and adjacent side of said lower face surface, a first edge surface extending between said first side of said upper face surface and a third side of said lower face surface, the intersection of said first edge surface with said upper face surface defining a first cutting edge along said first side of said upper face surface, said first edge surface being inclined downwardly and inwardly from said first cutting edge and defining a cutting face for said first cutting edge, a second edge surface extending between said second side of said upper face surface and a fourth side of said lower face surface, said second edge surface being inclined downwardly and inwardly from said second side of said upper face surface and defining a clearance face for said first cutting edge, a third edge surface extending between said first side of said lower face surface and a third side of said upper face surface, the intersection of said third edge surface with said lower face surface defining a second cutting edge along said first side of said lower face surface, said third edge surface being inclined upwardly and inwardly from said second cutting edge and defining a cutting face for said second cutting edge, a fourth edge surface extending between said second side of said lower face surface and a fourth side of said upper face surface, said fourth edge surface being inclined upwardly and inwardly from said second side of said lower face surface and defining a clearance face for said second cutting edge, said insert being located in said first slot with its upper face surface facing radially outwardly and with its longer cutting edge disposed in leading relationship with respect to the direction of rotation of the body, two inserts identical to said one insert and disposed in side-by-side relation in the end portion of said second slot, each of the inserts in said second slot being located with its lower face surface facing radially outwardly and with its shorter cutting edge disposed in leading relationship with respect to the direction of rotation of said body.

15. A cutter as defined in claim 14 in which the longer cutting edge of the insert in said first slot axially overlaps the shorter cutting edges of the two inserts in said second slot.

16. A cutter as defined in claim 15 in which the clearance face of the long cutting edge of the insert in said first slot is positioned to sweep through the same path as the clearance face of the short cutting edge of the outboard insert in said second slot when said body is rotated.

17. A cutting insert comprising a block of cutting material having first and second substantially flat face surfaces disposed in parallel planes and defining first and second rhomboids, respectively, each of said rhomboids having long and short sides, the two rhomboids being located such that the long and short sides of each rhomboid extend parallel to the long and short sides, respectively, of the other rhomboid, each rhomboid having one of its long sides spaced outwardly from the most nearly adjacent long side of the other rhomboid and having one of its short sides spaced outwardly from the most nearly adjacent short side of the other rhomboid, four edge surfaces extending between the sides of said rhomboids, a long cutting edge defined by the intersection of one of said edge surfaces with the outwardly spaced long side of said first rhomboid, and a short cutting edge defined by the intersection of another one of said edge surfaces with the outwardly spaced short side of said second rhomboid.

* * * * *